COATED ELECTRICAL COMPONENT

Filed Nov. 7, 1961

LEON PODOLSKY
JAMES R. TEEPLE
JOHN B. HERON JR
*INVENTORS.*

*BY* Connolly and Hutz
THEIR ATTORNEYS

United States Patent Office 3,293,514
Patented Dec. 20, 1966

3,293,514
COATED ELECTRICAL COMPONENT

Leon Podolsky, Pittsfield, Mass., and James R. Teeple and John B. Heron, Jr., Nashua, N.H., assignors to Sprague Electric Company, North Adams, Mass., a corporation of Massachusetts Filed Nov. 7, 1961, Ser. No. 150,725
6 Claims. (Cl. 317—242)

This invention relates to electrical components and more particularly to the improvements in the mechanical strength and uniformity of electrical components.

The instant invention will be described with reference to a ceramic disc capacitor, however, it is to be understood that this is not to be limiting since the concept can easily be adapted by one skilled in the art to printed circuits, convolutely wound capacitors, resistors, etc.

Conventional ceramic disc capacitors comprise a ceramic disc, a metal plate or electrode on either side thereof, leads attached to the electrodes, the capacitor unit being dip coated with a suitable insulating material.

The insulating material enveloping a ceramic disc capacitor must have and retain adequate dielectric strength throughout a wide range of temperature and moisture conditions. In addition to these characteristics, said material must have sufficient mechanical strength to withstand a certain amount of stress and strain incident to ordinary use. The weakest points of a coated disc capacitor are at the areas where the lead wires make contact with the insulating material near the periphery of the ceramic disc. At these points the insulating material extends for a short distance along the lead wire. In handling the capacitors after manufacture the lead wires are apt to be bent. Also when soldering the capacitors into a circuit, the lead wires are bent and comparatively high stress and strain is brought to bear at the aforementioned weak points.

FIGURE 1 of the drawing illustrates how bending the lead wires produces stress and strain on the insulating material covering a prior art disc capacitor which results in fracture of the insulation. The bending of the leads also produces a strain on the solder connection and on the ceramic disc which can lead to disconnection or a cracking of the disc.

The foregoing problem obviously is not confined to capacitors since most electrical components receive, as one of the final steps in their manufacture, a coating of insulation designed primarily to protect the units from moisture. The comparatively inexpensive insulating materials used are not tough and resilient but are somewhat brittle. Thus, as in the case of the capacitors the insulating material cannot withstand the stress and strain set up when the leads are bent at the point where the leads protrude through this material.

For example, phenol-formaldehyde resins, commonly used as the insulating materials in electrical components, have many advantages which dictate their continued use. Among these are good electrical properties, indefinite pot life, a degree of porosity which permits moisture to be expelled during curing, economy, etc. One disadvantage of these materials, as indicated above, is that they are comparatively frangible. Thus, because of the nature of this commonly used insulating material, fracture and cracks occur at points of strain. One result of this cracking is that moisture gains access to the interior of the component eventually causing failure.

Silver is the commonest electrode employed in ceramic disc capacitors. When two such silver electrodes, in close proximity to each other, are in an electric circuit where one is cathodic and the other is anodic, metallic silver will migrate from the anodic electrode to the cathodic electrode in the presence of moisture. This takes place through the following mechanism when moisture is present in the electric circuit. Hydroxyl ions from the ionization of water, migrate to the anodic element dissolving silver on the anode as silver hydroxide. The silver ions produced by ionization of silver hydroxide migrate through the layer of moisture to the cathode where they are deposited as metallic silver. Subsequent electrodeposits form at the outer edge of the silver deposits and eventually closes the gap between the cathode and the anode, thus creating a short-circuit.

Also, with the advent of automation, electrical components, e.g. capacitors, are automatically soldered into circuits. This demands that the lead wires of the components be uniformly spaced. Prior methods of making electrical components do not insure this required uniformity.

It is an object of this invention to overcome the foregoing and related problems.

It is another object of this invention to strengthen electrical components at the points where the lead wires protrude through the insulating material.

It is a further object of this invention to strengthen ceramic disc capacitors at the points where the lead wires protrude through the insulating material.

It is yet another object of this invention to produce ceramic disc capacitors wherein the lead wires are uniformly spaced.

It is still another object of this invention to present a process for forming ceramic disc capacitors.

These and other objects of the invention will appear in the description to follow when read in conjunction with the appended claims and the accompanying drawing in which:

Broadly, the objects of this invention are achieved by providing a non-frangible yoke about the leads of electrical components. It is preferred that the yoke have the general shape of either a truncated rectangular-based pyramid or the general shape defined by truncating a triangular prism.

Figure 1:
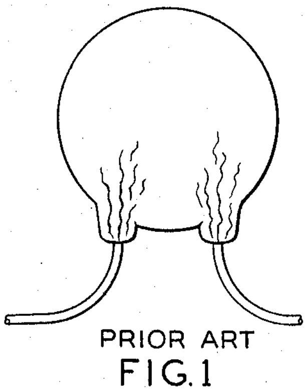
PRIOR ART FIG.1
FIGURE 1 is a side elevation of a conventional ceramic disc capacitor.
Figure 4:
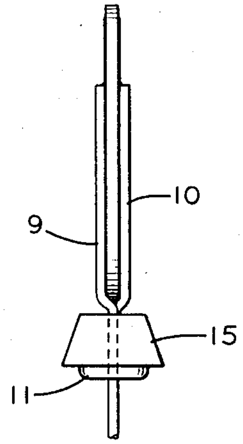
FIGURE 4 is an end view of FIGURE 3.
Figure 2:
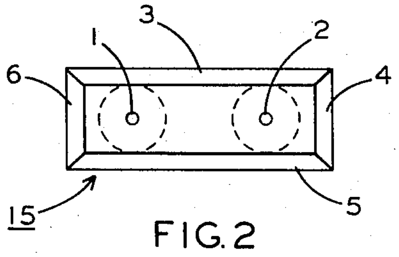
FIGURE 2 is a top plan view of a plastic yoke in accordance with the invention.
Figure 5:
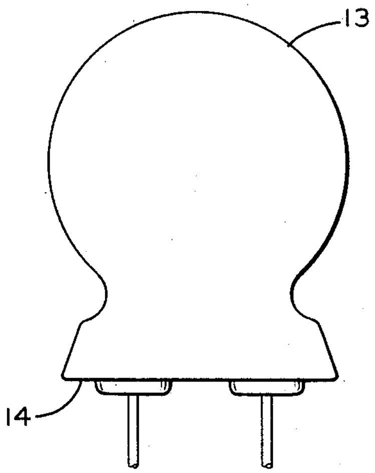
FIGURE 5 is a side elevation of the completed insulated capacitor of the invention.
Figure 3:
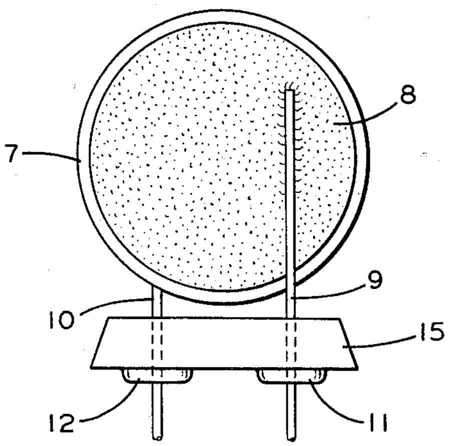
FIGURE 3 is a side elevation of a ceramic disc capacitor and the inventive yoke without the insulating envelope.

The construction employed in the invention is better understood through reference to the drawing. FIGURE 1 shows a conventional ceramic disc capacitor after the lead wires have been bent. This subjects the insulating envelope to stress and strain at the point of bending which results in cracking and fracturing the insulation as shown. It also subjects the solder connections and the ceramic disc to strain which may result in disconnection or cracking of the disc. FIGURE 2 shows a plan view of a preferred shape of the yoke 15 of the instant invention wherein 1 and 2 are accurately spaced lead holes, 3, 4, 5, and 6 are the chamfered or beveled sides of the yoke. FIGURE 3 is a side elevation which shows a ceramic disc capacitor and the inventive yoke 15 without the insulating envelope wherein 7 is a ceramic disc, 8 is a metal electrode, 9 and 10 are lead wires soldered to the electrodes and 11 and 12 are doughnut-shaped feet extending from the base of the yoke. FIGURE 4 is an end view of a ceramic disc capacitor which shows lead wires 9 and 10 oppositely offset on either side of the ceramic disc and soldered to the electrodes. FIGURE 5 shows a side view of the completed disc capacitor wherein 13 is an envelope of insulating material which extends to but not overlapping the base 14 of the yoke.

The specific materials contemplated in forming the yoke of the electrical components are not limited to any particular chemical class but rather are choosen on the basis of physical characteristics. Thus, any material, organic or inorganic, which is comparatively tough and not frangible or subject to cracking is contemplated. For example, the thermoplastic and thermoset resins, such as, diallyl phthalate resins, epoxy resins, nylon, polyethylene etc. are particularly suitable.

The yoke can be formed in any convenient manner which will result in a yoke of the specified configuration. For instance, the lead wires can be placed in a mold having the general shape of a truncated triangular prism or a truncated rectangular-based pyramid and the resin introduced and molded. The spacing of the leads will depend upon the particular type of component of which this subassembly will become a part.

A specific example of the formation of a ceramic disc capacitor utilizing the inventive yoke is as follows:

A suitable high dielectric material, for example, a barium titanate, in the shape of a disc, has positioned on both sides thereof metal electrodes, such as, fired-in-place silver. Using an epoxy resin available under the tradename "Epon," a yoke is molded about two wire leads. The general shape of the yoke is that of a truncated triangular prism having two doughnut-shaped feet extending from the base thereof. The lead wires are parallel and oppositely offset during molding. This lead wire-yoke subassembly is then dip soldered to the electrodes of the dielectric disc. The insulating material for this capacitor is a high dielectric resin which yields a porous coating, such as, a phenol-formaldehyde resin containing an inert filler. The dip is prepared by mixing the resin with a suitable solvent to yield a thick insulating dip material. The capacitor unit is then immersed, disc-end first, into the dip material so that the dip material contacts all sides of the yoke to a point level with the base of said yoke. Care is taken so that the dip material does not flow over onto the base of the yoke. The coated unit is then removed from the dip material and the solvent expelled by moderate heating. The unit is then heated to approximately 150° C. to cure the resin and vaporize any moisture. Thereafter, the open pores of the insulating material are sealed by dipping the unit in molten wax.

The beveled or chamfered sides of the yoke are necessary because of the strong surface tension of the insulating dip material. In the absence of these beveled sides, that is if the sides were vertical, the dip material would be pushed away from the sides of the yoke and only make contact with the base of the yoke. As a result of the beveled sides, the dip material in effect rolls upon and wets the beveled sides of the yoke resulting in an intimate contact therewith.

The aforementioned doughnut-shaped feet extending from the base of the yoke, in addition to giving additional strength to the yoke, provides for a space between the base of the yoke and the circuit surface to which the capacitor is attached. Any soldering flux adjacent to the lead wires can be conveniently flushed out through this space. The main purpose of the feet is to space the unit from the circuit surface. When more than two leads extend through the yoke the feet may be positioned only at the ends of the yoke. It is not necessary that the leads pass through the feet. Hence, the feet may take any convenient shape, such as a square, rectangular or cylindrical riser, which will provide a convenient flushing space.

As many apparently widely different embodiments of this invention may be made without departing from the spirit and scope hereof, it must be understood that the invention is not limited to the specific embodiment hereof, except as defined in the appended claims.

What is claimed is:

1. An electrical component comprising a component assembly having a plurality of lead wires extending therefrom, said lead wires extending through and linked by a non-frangible insulating yoke, said yoke having a rectangular face on its side remote from said component assembly, said yoke having beveled sidewalls tapering outwardly away from said component assembly; said rectangular face having riser feet extending therefrom, and a frangible insulating dip material covering the component assembly and the beveled sidewalls to a point just even with said rectangular face.

2. The component of claim 1 wherein said yoke has two oppositely disposed beveled sidewalls.

3. The component of claim 2 wherein said yoke has two pairs of oppositely disposed beveled sidewalls.

4. An electrical capacitor comprising a disc of dielectric material, metal electrodes on each side thereof, lead wires attached to said electrodes, said lead wires extending through and linked by a non-frangible yoke positioned about said lead wires, said yoke having a rectangular face on its side remote from the capacitor and having beveled sidewalls tapering outwardly away from the capacitor; said rectangular face having riser feet extending therefrom; said lead wires being offset in opposite directions from the center line of said yoke on the side adjacent the capacitor; and a relatively frangible insulating dip material covering the capacitor and the beveled sidewalls of said yoke to a point just even with said rectangular face.

5. The capacitor of claim 4 wherein said yoke has two oppositely disposed beveled sidewalls.

6. The capactior of claim 4 wherein said yoke has two pairs of oppositely disposed beveled sidewalls.

References Cited by the Examiner

UNITED STATES PATENTS

| | | | |
|---|---|---|---|
| 2,850,687 | 10/1958 | Hammes | 264—272 X |
| 3,063,134 | 11/1962 | McGraw | 29—155.5 |
| 3,122,679 | 2/1964 | Kislan et al. | 317—100 |

FOREIGN PATENTS

| | | |
|---|---|---|
| 1,213,316 | 10/1959 | France. |
| 913,938 | 6/1954 | Germany. |

OTHER REFERENCES

Electronics, vol. 34, No. 6, Feb. 10, 1961, page 33.

LEWIS H. MYERS, *Primary Examiner.*

JOHN F. BURNS, LARAMIE E. ASKIN, *Examiners.*

E. GOLDBERG, *Assistant Examiner.*